(12) United States Patent
Panda et al.

(10) Patent No.: US 10,672,115 B2
(45) Date of Patent: Jun. 2, 2020

(54) WEAKLY SUPERVISED ANOMALY DETECTION AND SEGMENTATION IN IMAGES

(71) Applicant: Siemens Energy, Inc., Orlando, FL (US)

(72) Inventors: Rameswar Panda, Riverside, CA (US); Ziyan Wu, Princeton, NJ (US); Arun Innanje, Dayton, NJ (US); Ramesh Nair, San Francisco, CA (US); Ti-chiun Chang, Princeton Junction, NJ (US); Jan Ernst, Plainsboro, NJ (US)

(73) Assignee: Siemens Corporation, Iselin, NJ (US)

( * ) Notice: Subject to any disclaimer, the term of this patent is extended or adjusted under 35 U.S.C. 154(b) by 0 days.

(21) Appl. No.: 16/075,167

(22) PCT Filed: Dec. 6, 2017

(86) PCT No.: PCT/US2017/064871
§ 371 (c)(1),
(2) Date: Aug. 3, 2018

(87) PCT Pub. No.: WO2018/106783
PCT Pub. Date: Jun. 14, 2018

(65) Prior Publication Data
US 2019/0287234 A1    Sep. 19, 2019

Related U.S. Application Data

(60) Provisional application No. 62/430,463, filed on Dec. 6, 2016.

(51) Int. Cl.
*G06T 7/00* (2017.01)
*G06T 7/162* (2017.01)
(Continued)

(52) U.S. Cl.
CPC .......... *G06T 7/0004* (2013.01); *G06N 3/0454* (2013.01); *G06N 3/084* (2013.01);
(Continued)

(58) Field of Classification Search
CPC .......... G06N 3/084; G06T 2207/20084; G06T 7/136
See application file for complete search history.

(56) References Cited

U.S. PATENT DOCUMENTS

| | | | |
|---|---|---|---|
| 2014/0029817 A1 | 1/2014 | Gleichman | |
| 2017/0228617 A1* | 8/2017 | Vernaza | ............ G06T 7/11 |
| 2019/0138826 A1* | 5/2019 | Ghafarianzadeh | ............ G06K 9/00671 |

OTHER PUBLICATIONS

International Search Report dated Mar. 6, 2018; Application No. PCT/US2017/064871; Filing Date: Dec. 8, 2017; 12 pages.
(Continued)

*Primary Examiner* — Ross Varndell

(57) ABSTRACT

Systems and methods are disclosed for processing an image to detect anomalous pixels. An image classification is received from a trained convolutional neural network (CNN) for an input image with a positive classification being defined to represent detection of an anomaly in the image and a negative classification being defined to represent absence of an anomaly. A backward propagation analysis of the input image for each layer of the CNN generates an attention mapping that includes a positive attention map and a negative attention map. A positive mask is generated based on intensity thresholds of the positive attention map and a negative mask is generated based on intensity thresholds of the negative attention map. An image of segmented anomalous pixels is generated based on an aggregation of the positive mask and the negative mask.

14 Claims, 7 Drawing Sheets

(51) Int. Cl.
    *G06T 7/136*    (2017.01)
    *G06T 7/194*    (2017.01)
    *G06T 7/90*     (2017.01)
    *G06N 3/08*     (2006.01)
    *G06N 3/04*     (2006.01)
    *G06T 7/11*     (2017.01)

(52) U.S. Cl.
    CPC ............... *G06T 7/11* (2017.01); *G06T 7/136* (2017.01); *G06T 7/162* (2017.01); *G06T 7/194* (2017.01); *G06T 7/90* (2017.01); *G06T 2207/20021* (2013.01); *G06T 2207/20081* (2013.01); *G06T 2207/20084* (2013.01)

(56) References Cited

OTHER PUBLICATIONS

Pathak, Deepak et al.: "Constrained Convolutional Neural Networks for Weakly Supervised Segmentation"; Oct. 2015; arXiv:1506.03648v2.

Wenxuan Xie et al: "Weakly-Supervised Image Parsing via Constructing Semantic Graphs and Hypergraphs", Multimedia, ACM, 2 Penn Plaza, Suite 701 New York NY 10121-0701 USA, Nov. 3, 2014 (Nov. 3, 2014), pp. 277-286, XP058058675 /03.11.2014.

Shenlong Wang et al: "AutoScaler: Scale-Attention Networks for Visual Correspondence", Arxiv.org, Cornell University Library, 201 Olin Library Cornell University Ithaca, NY 14853, Nov. 17, 2016 (Nov. 17, 2016), XP080732615 / Nov. 17, 2016.

\* cited by examiner

WEAKLY SUPERVISED ANOMALY DETECTION AND SEGMENTATION IN IMAGES

BACKGROUND

Inspection of systems and components in an industrial setting may involve some form of visual analysis. For example, quality inspection of manufactured items may detect anomalies or defects at an early stage of the production process. Current methods of anomaly detection include manual inspection by a specialist or machine vision based approaches to detect anomalies by processing captured images. Manual inspection is unsuitable for real time applications since it has low degree of automation and depends heavily on the experience of the specialist. Machine vision based approaches require strong supervision in the form of pixel-wise labeling (i.e., labeling each pixel of an image as either having anomaly or not) or bounding box annotation by outlining the anomalous parts of an image. These fully supervised methods are difficult to scale up and also time-consuming since they require a large amount of manual labeling in form of pixels or bounding box annotations.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Aspects of embodiments of this disclosure include a method which uses a weakly supervised network to detect anomalies in images of an object. The anomalies may correspond to defects in the object depicted in the image. A classifier, such as a Convolutional Neural Network (CNN), may be trained for classification of an image of an object. Alternatively, a Recurrent Neural Network may be used as the classifier. A captured image may be processed by the classifier to classify the content of the image, such as identifying any presence of an anomaly in the image. Without prior knowledge of what shape or form the anomalies in an image take, a gradient-based back propagation of the classifier may be applied to discover the intrinsic properties of normal and abnormal parts of the image. For example, an attention mapping may be generated in the form of a grayscale image representation of the input image.

With a backward propagation pass of the classifier, the anomalous regions of the image may be identified from the attention mapping in a manner much quicker than fully supervised techniques (e.g., pixel wise labeling and bounding box annotation). Color models may be extracted from an intensity distribution in the attention mappings. By assigning colors to foreground and background, normal and abnormal regions of the input image may be defined from the attention mappings as foreground and background masks. A segmentation of the image anomaly may be recovered from the foreground mask for each pixel in the input image using a segmentation algorithm.

Figure 1:
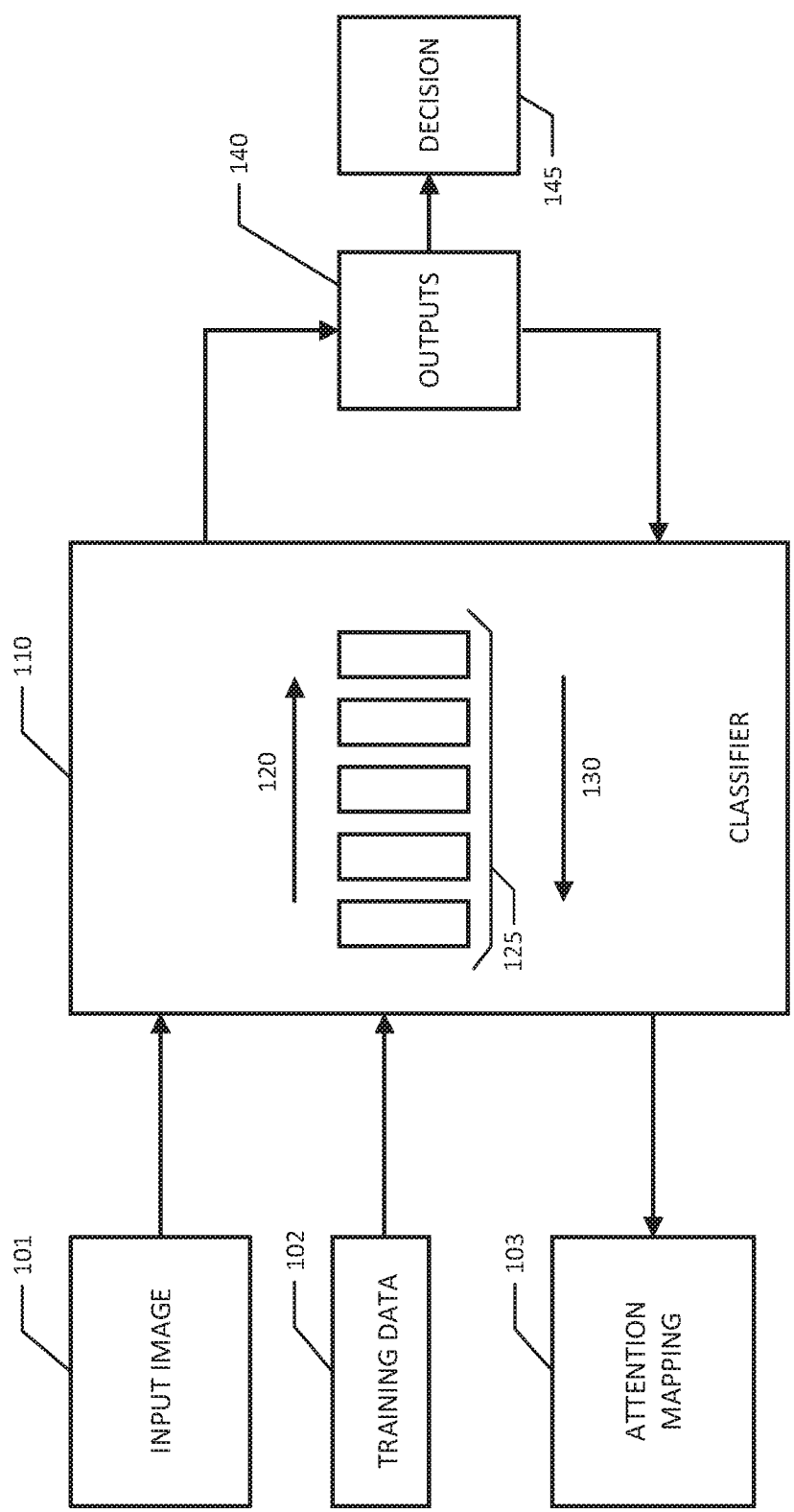
FIG. 1 is a block diagram depicting detection of image anomalies in accordance with one or more example embodiments of the disclosure.

FIG. 1 is a block diagram depicting detection of image anomalies in accordance with one or more example embodiments of the disclosure. A classifier 110, such as a CNN for example, may have hidden layers 125, which may include or omit one or more of the following layer types: convolutional layers, max-pooling layers, fully connected layers and softmax layers.

During a training period, the classifier 110 may be trained to classify images, i.e., learn to identify objects in a series of input images, based on a comparison of input images to training data 102, which may be images or patches. The training data 102 may include a label or annotation which identifies the classification to be learned by the classifier 110. The classifier 110 may further be trained to classify whether an image includes anomalous regions. The training data 102 used by the classifier 110 may be defined by patches computed from input images and corresponding ground truth labels indicating whether a patch contains anomalous regions or not. Patch-based training can help the classifier 110 to learn fine-grained characteristics of anomalous regions by focusing on a smaller area. Patch-based training may also avoid overfitting in cases where the training data is too small to train a model.

By way of example, training data 102 may include a set of images that are known to have image anomalies, and annotated as such. A binary label may be defined for the entire training image based on the presence of any anomalous parts in an image, which can be easily obtained in real-time without extensive labeling effort. The anomalous regions in the training images need not be defined, segmented or outlined. An adequate training image may be defined as having at least one anomalous pixel. Each training image may be labeled or annotated as and stored prior to training of the classifier 110. For example, a training image having an anomalous regions may be annotated as "positive" and a training image having no anomalous region may be annotated as "negative". Because the training data 102 is image-level based (i.e., the annotation applies to the entire image) rather than pixel-level based, the deep learning of the classifier 110 according to the embodiments of the disclosure is considered to be weakly supervised. By the application of image-level based annotation, the training process is greatly streamlined and can be completed with reduced effort.

The classifier 110 may be trained without the benefit of previous data or information (i.e., from scratch) or may be fine-tuned depending on the size of the training set in the application domain.

Training of the classifier 110 may apply a cost function that measures how successful the expected output is compared to the given training sample, where each hidden layer 125 is a weighted and biased function f performing an operation on at least two inputs. Adjustments to the weights and bias values may be made until expected output values are acceptable for a series of forward passes.

During normal operation after the classifier 110 has been trained, the classifier 110 may process an input image 101 during a forward pass 120, performing a classification encoding of each of the image pixels to produce a plurality of outputs 140. For example, in a case where the classification is positive P for presence of an image anomaly or negative N for absence of an anomaly, there may be two outputs with likelihood values between 0 and 1, such as P=0.9 and N=0.1 Here, since P>N, the decision 145 would be defined to indicate "positive", i.e., that the input image contains an anomaly. In this example having two outputs 140, the decision 145 is binary.

In response to a classification decision 145, the classifier 110 may perform a backward pass 130 of each convolution layer 125 in reverse order of the forward pass 120. As an example, a gradient function may be applied to a result value obtained during the forward pass function f for a given layer 125. In an embodiment, the following back propagation operation may be performed on each layer 125 individually:

$$\nabla f = \frac{\delta f}{\delta x} \qquad \text{Equation 1}$$

where $\nabla f$ is a gradient of the function $f$ on input x, and determined by a partial derivative.

Following the final operation of backward propagation 130 through the hidden layers 125 for each pixel of the image, a gradient value is determined for each pixel and converted to an attention mapping 103. For each pixel in the attention mapping 103, a grayscale value may be assigned proportional to the gradient value. The attention mapping 103 may be defined by a reciprocal mapping between the forward propagation and the backward propagation of the classifier 110. The attention mapping 103 includes attention maps generated via back-propagation with both positive and negative signals. To generate the positive attention map and the negative attention map, a positive signal or negative signal for the back propagation may be generated by setting positive and nodes in a fully connected layer in the classifier 110. For example, the positive signal for the back propagation may be generated by setting the positive node to value 1 and the negative node to value 0. The negative signal for the back propagation may be generated by setting the positive node to value 0 and the negative node to value 1. The attention mapping 103 may be generated by two back propagation passes, one with the positive signal and the second with the negative signal. A positive attention map, corresponding to the positive signal, encodes the location of the anomalous pixels and hence can be used for anomaly segmentation as described below. A negative attention map, corresponding to the negative signal, encodes the location of the normal pixels. Both the positive and negative attention maps may include pixels that are neither encoded anomalous nor normal, and are considered to be uncertain. The negative attention map can be used to improve the confidence of the positive attention map by reducing the area of uncertain pixels. Attention map pixels are encoded using a scoring based on magnitude threshold scale. The negative attention map may reconfirm the location of anomalous pixels by determining that for each pixel, there is not a high score on both positive and negative attention maps.

Figure 2:
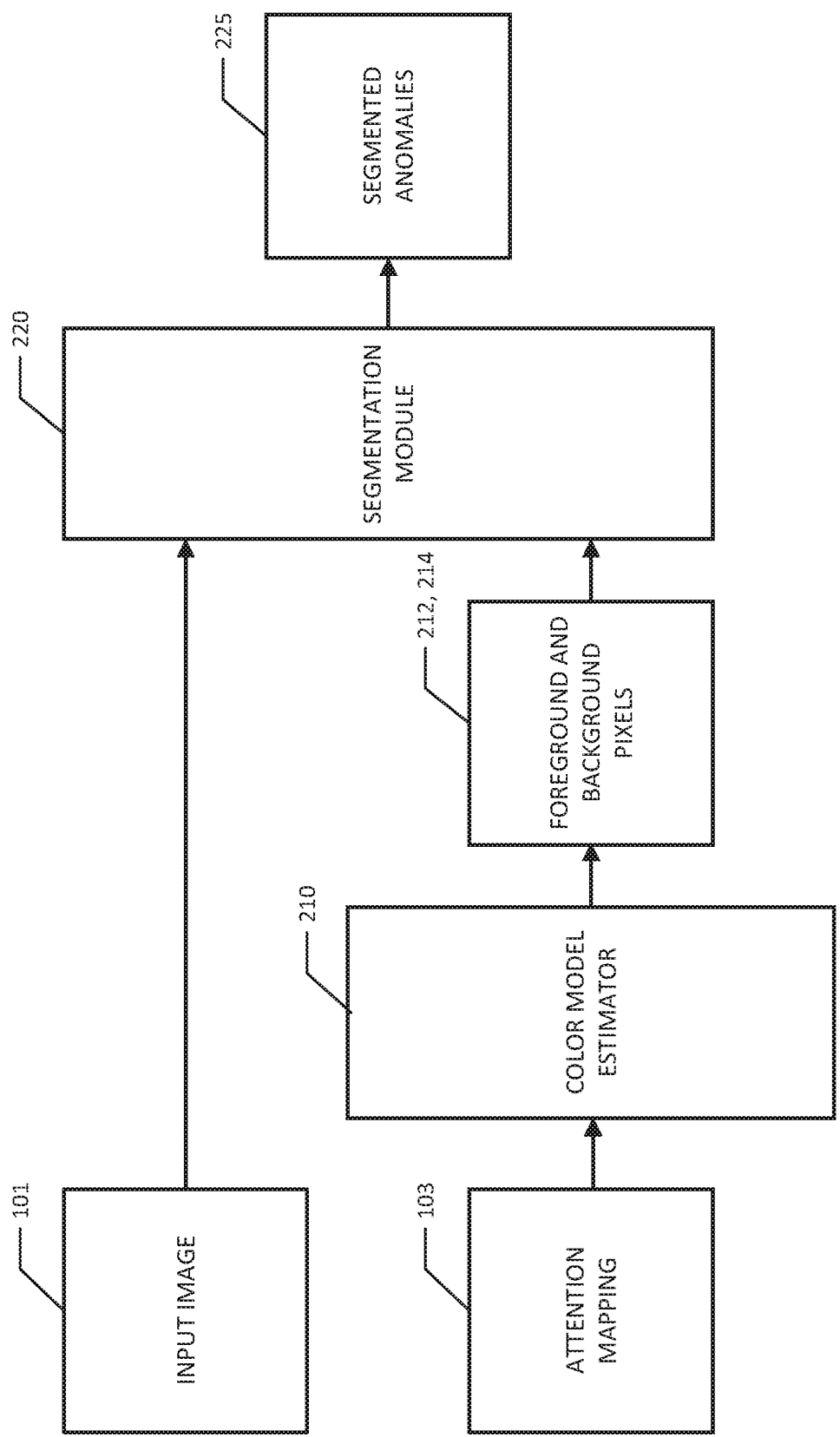
FIG. 2 is block diagram depicting segmentation of image anomalies in accordance with one or more example embodiments of the disclosure.

FIG. 2 is a block diagram depicting segmentation of image anomalies in accordance with one or more example embodiments of the disclosure. A color model estimator 210 may estimate color models for the foreground pixels 212 and the background pixels 214 of the attention mapping 103. The color models may be computed based on pixel wise attention score, which indicates the level of influence from pixels when classifying the image or patch as having anomalous or defective regions. A segmentation module 220 may generate a mask of segmented anomalies 225 based on a comparison between the input image 101 and the foreground pixels 212 and background pixels 214.

Figure 3:
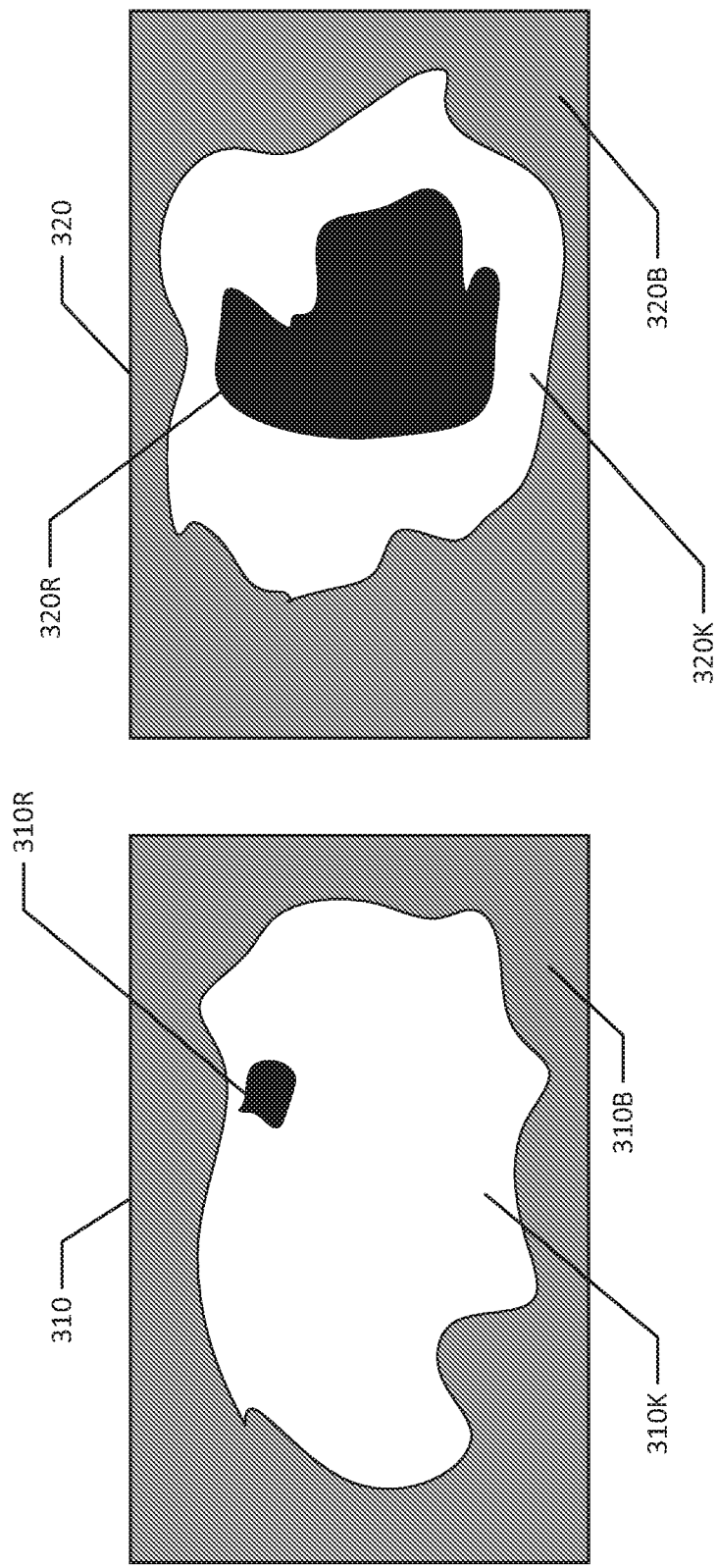
FIG. 3 is a schematic diagram of color model estimations of positive and negative attention mappings in accordance with one or more example embodiments of the disclosure.

FIG. 3 is a schematic diagram of color model estimations of positive and negative attention mappings in accordance with one or more example embodiments of the disclosure. The color model estimations 310 and 320 may be generated by the color model estimator 210 shown in FIG. 2. Attention mappings 103 are received by the color model estimator 210 and processed according to thresholds on an intensity distribution of each attention mapping, in which the attention mapping includes both a positive attention map and a negative attention map. In this example, color model estimation 310 corresponds to a positive attention map 103 and color model estimation 320 corresponds to a negative attention map 103.

The color model estimator 210 may define foreground pixels with a red color as shown in region 310R and background pixels with a blue color as shown in region 310B. The color model estimator 201 may define the foreground to represent pixels with a high likelihood of being anomalous, and the background region may be defined to represent pixels with a high likelihood of being the background. The foreground pixels 310R and background pixels 310B may be determined according to a thresholding analysis of the pixel magnitude in the attention mapping 103. For example, pixel magnitudes greater than a first threshold T1 may be treated as foreground pixels 310R and pixel magnitudes less than a second threshold T2 may be treated as background pixels 310B. As a specific example, for a magnitude range 0-10.0, threshold T1 may be set to magnitude equal to 8.0 and threshold T2 may be set equal to 2.0. The region 310K may be defined with a color third color, such as black, to represent the remaining pixels of the attention mapping which have a pixel magnitude between thresholds T1 and T2. The color model estimation for region 310K pixels may thus represent pixels for which the foreground or background determination is uncertain. Once the foreground and background pixels are determined, a positive mask 310 is defined.

A negative mask 320 may be generated by the color model estimator 210 using a negative attention map 103. Accordingly, the foreground pixels may be defined by a red pixel region (red mask) 320R, the background pixels may be defined by a blue pixel region (blue mask) 320B, and a black pixel region (black mask) 320K may represent pixels for which the determination is uncertain. While colors red, blue and black are described here, the color modeling may assign any three colors to distinguish the pixel regions. In this example, the foreground represents pixels having no anomalous regions, and the background represents pixels with a high likelihood of being background pixels. In a similar way, the three pixel regions 320R, 320B and 320K may be determined by a first threshold T1' and a second threshold T2' as described above with respect to color model estimation 310. The thresholds T1 and T1' may or may not be equivalent and the thresholds T2 and T2' may or may not be equivalent. In general, the settings for thresholds T1, T1', T2 and T2' may be based on various factors, such as performance of classifier 110 and the characteristics of the post-processing segmentation module 220. For example, if the performance of the classifier 110 and/or the segmentation module 220 has high uncertainty, conservative thresholds may be selected (i.e., greater values for T1 and T1' and lesser values for T2 and T2' leaving a larger "uncertain" middle band between the thresholds).

Figure 4:
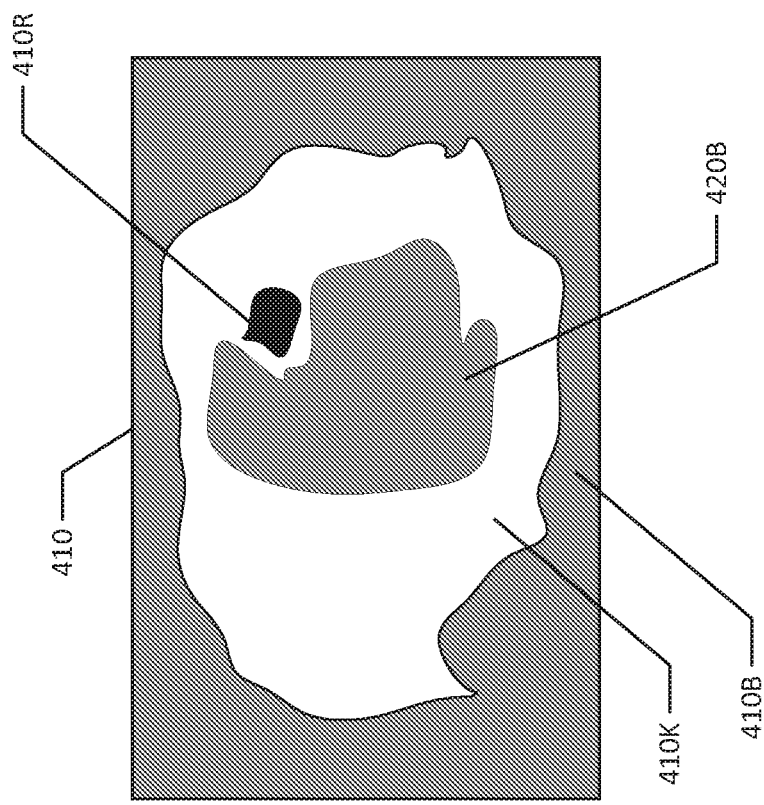
FIG. 4 is a schematic diagram of an aggregated color model estimation based on the color model estimations shown in FIG. 3 in accordance with one or more example embodiments of the disclosure.

FIG. 4 is a schematic diagram of an aggregated color model estimation based on the positive mask 310 and the negative mask 320 shown in FIG. 3 in accordance with one or more example embodiments of the disclosure. The color model estimator 210 of FIG. 2 may generate color model estimation 410 as a final mask based on a sum of color masks of color model estimations 310 and 320. A blue pixel region 420B may be derived from converting red pixel region 320R to represent a region with high likelihood as being background with respect to anomalous pixels. A red pixel region 410R may be derived from pixel region 310R to represent a region with high likelihood of having anomalous pixels. Any overlap of red pixel region 310R and red pixel region 320R are converted to uncertain black pixel region 410K. The black pixel region 410K may be derived from the sum of black region pixels 310K and 320K. The background region pixels 410B are defined to correspond to blue pixel regions 310B and 320B, representing pixels having a high likelihood of background pixels to both color model estimations 310 and 320. The advantage of generating the composite color model estimation 410 is that the uncertainty region 410K may be reduced in size based on the determination of the background region 420B. Also, any false positive pixels may be converted to background by the intersection of the red pixel regions 310R and 320R. The certainty of anomalous regions is thus improved.

Figure 5:
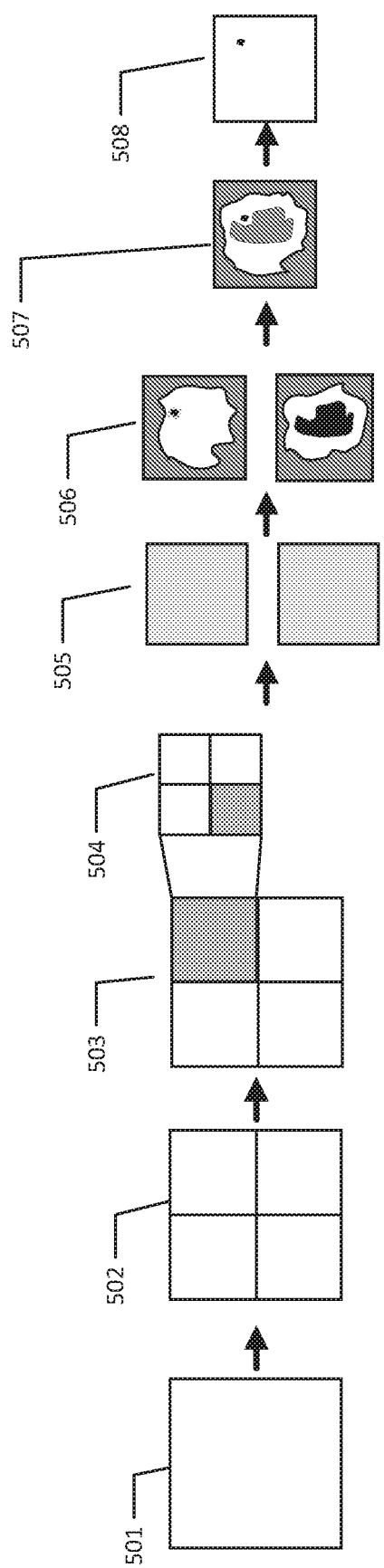
FIG. 5 is a flow diagram depicting segmentation of image anomalies based on input image patches in accordance with one or more example embodiments of the disclosure.

FIG. 5 is a flow diagram depicting segmentation of image anomalies based on input image patches in accordance with one or more example embodiments of the disclosure. Image analysis may be improved by dividing the input image into patches. For example, an input image 501 may be divided into patches 502. Each patch may be classified by a forward propagation pass through classifier 110 as shown in FIG. 1. For patches classified as negative, all pixels of the patch may be defined as background for all pixels in a final aggregated foreground/background prior mask. For positive classification patches 503, the patch may be subdivided into patches 504, and a classification processing for each subdivided patches may commence. Subdivided patches 504 resulting in negative classification may then be defined as background pixels in entirety in a final aggregated foreground/background prior mask. Further patch subdivisions may be divided out of patches 504 until a limit is reached, such as maximum number of subdivisions, reaching a minimum size patch, or no further positive classifications are determined.

Attention mappings 505 may be determined for each positive patch from patches 504 by a backward propagation pass using positive and negative signals. Foreground/background masks 506 may be generated from the attention mappings 505 as described above with respect to color model estimations shown in FIG. 3. An aggregated foreground/background mask 507 may be determined as described above with respect to FIG. 4. Post-processing of the aggregated mask 507 may produce a segmentation of anomalous pixels 508. A graph-cut color segmentation technique may be used to generate the segmentation 508.

Figure 6:
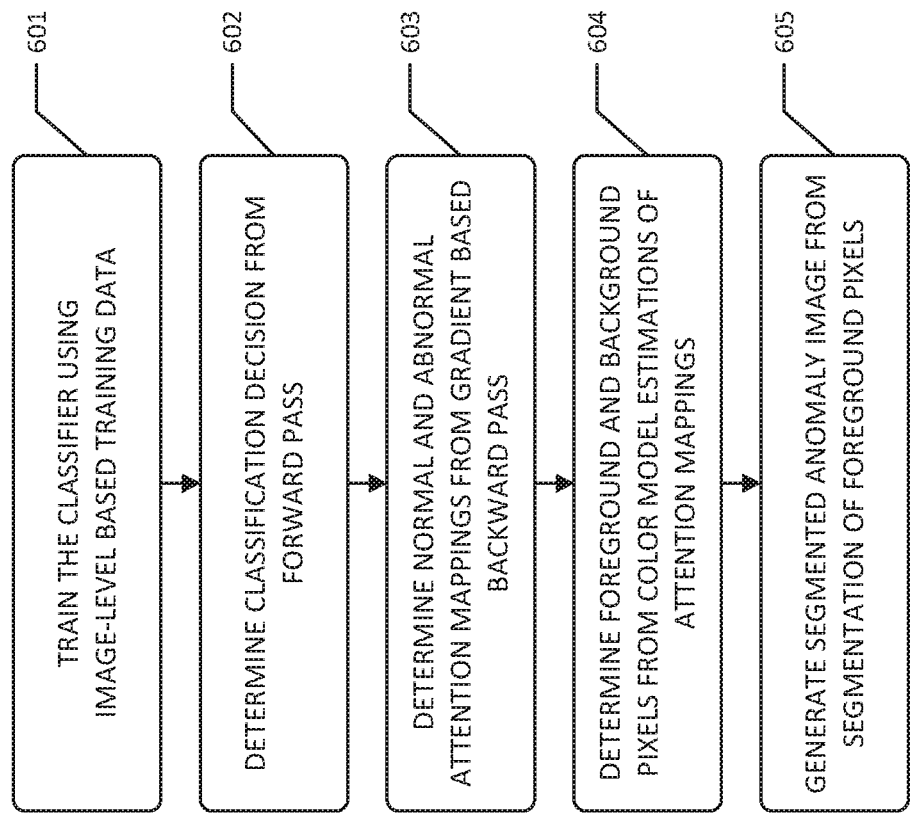
FIG. 6 illustrates a method for segmentation of image anomalies in accordance with one or more example embodiments of the disclosure.

FIG. 6 illustrates a method 600 for segmentation of image anomalies in accordance with one or more example embodiments of the disclosure. Each operation of the method 600 may be performed by one or more components that may be implemented in any combination of hardware, software, and/or firmware. In certain example embodiments, one or more of these component(s) may be implemented, at least in part, as software and/or firmware that contains or is a collection of one or more program modules that include computer-executable instructions that when executed by a processing circuit cause one or more operations to be performed. A system or device described herein as being configured to implement example embodiments of the invention may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Returning to FIG. 6, the classifier may be trained 601 to learn recognition of defects and anomalies in input images by using image-level based training data, such as positive or negative classification training data, with positive classification defined by presence of an anomalous region. The trained classifier may receive input images and may determine a classification decision 602 for each input image during a forward pass.

Normal and abnormal attention mappings may be determined 603 from a gradient based backward pass through the classifier. Foreground and background pixels may be determined 604 from color model estimations of the normal and abnormal attention mappings. The foreground and background may be an aggregated mask based on combining a normal foreground and background mask and an abnormal foreground and background mask. A segmented anomaly image may be generated 605 from the foreground pixels.

Figure 7:
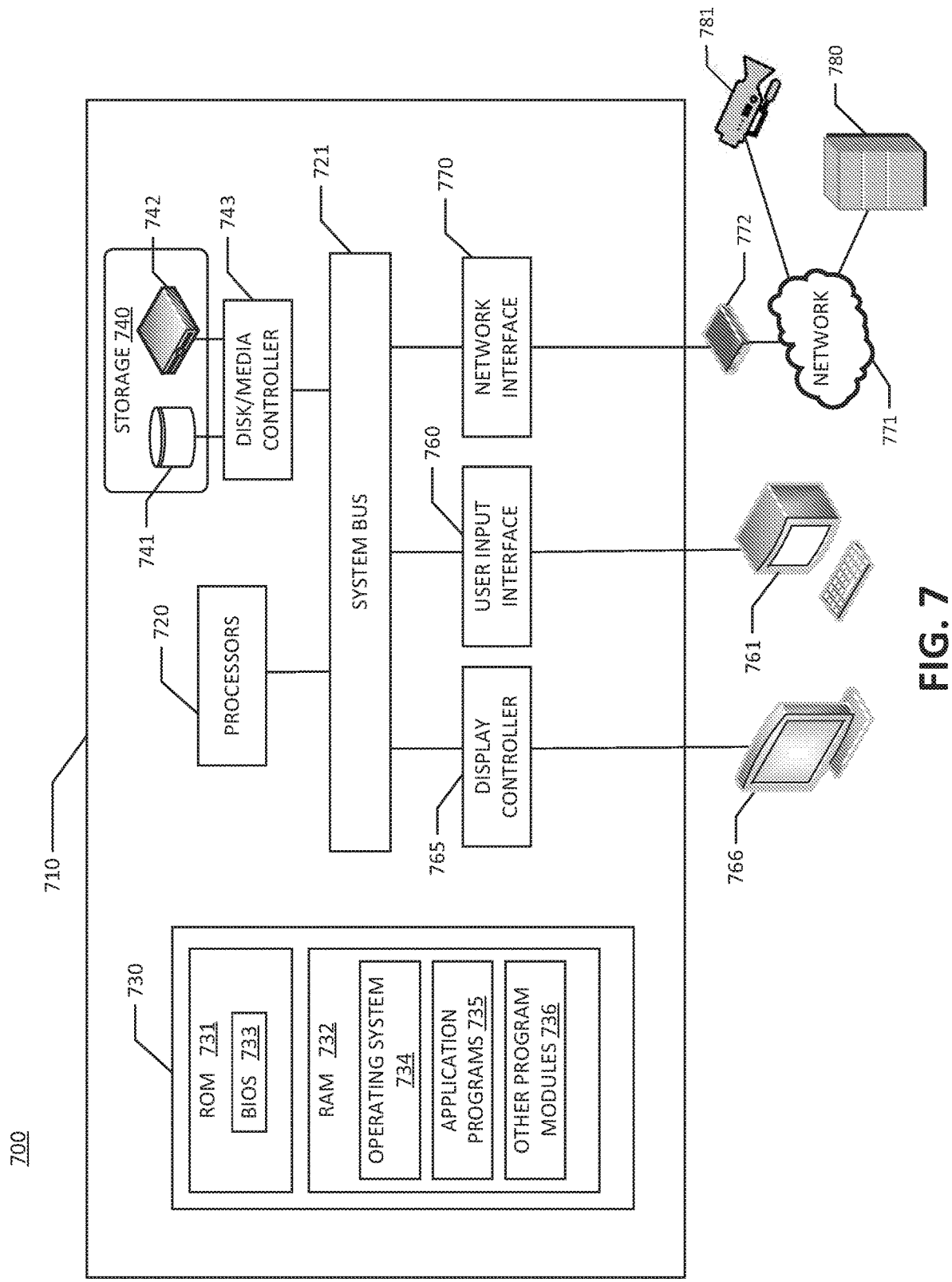
FIG. 7 is a block diagram illustrating an example of a computing environment in accordance with one or more example embodiments of the disclosure.

FIG. 7 illustrates an exemplary computing environment 700 within which embodiments of the disclosure may be implemented. Computers and computing environments, such as computer system 710 and computing environment 700, are known to those of skill in the art and thus are described briefly here.

As shown in FIG. 7, the computer system 710 may include a communication mechanism such as a system bus 721 or other communication mechanism for communicating information within the computer system 710. The computer system 710 further includes one or more processors 720 coupled with the system bus 721 for processing the information.

The processors 720 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 608 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 721 may include at least one of a system bus, a memory bus, an address bus, or a message bus, and may permit exchange of information (e.g., data (including computer-executable code), signaling, etc.) between various components of the computer system 710. The system bus 721 may include, without limitation, a memory bus or a memory controller, a peripheral bus, an accelerated graphics port, and so forth. The system bus 721 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 7, the computer system 710 may also include a system memory 730 coupled to the system bus 721 for storing information and instructions to be executed by processors 720. The system memory 730 may include computer readable storage media in the form of volatile and/or nonvolatile memory, such as read only memory (ROM) 731 and/or random access memory (RAM) 732. The RAM 732 may include other dynamic storage device(s) (e.g., dynamic RAM, static RAM, and synchronous DRAM). The ROM 731 may include other static storage device(s) (e.g., programmable ROM, erasable PROM, and electrically erasable PROM). In addition, the system memory 730 may be used for storing temporary variables or other intermediate information during the execution of instructions by the processors 720. A basic input/output system 733 (BIOS) containing the basic routines that help to transfer information between elements within computer system 710, such as during start-up, may be stored in the ROM 731. RAM 732 may contain data and/or program modules that are immediately accessible to and/or presently being operated on by the processors 720. System memory 730 may additionally include, for example, operating system 734, application programs 735, and other program modules 736.

The operating system 734 may be loaded into the memory 730 and may provide an interface between other application software executing on the computer system 710 and hardware resources of the computer system 710. More specifically, the operating system 734 may include a set of computer-executable instructions for managing hardware resources of the computer system 710 and for providing common services to other application programs (e.g., managing memory allocation among various application programs). In certain example embodiments, the operating system 734 may control execution of one or more of the program modules depicted as being stored in the data storage 740. The operating system 734 may include any operating system now known or which may be developed in the future including, but not limited to, any server operating system, any mainframe operating system, or any other proprietary or non-proprietary operating system.

The computer system 710 may also include a disk/media controller 743 coupled to the system bus 721 to control one or more storage devices for storing information and instructions, such as a magnetic hard disk 741 and/or a removable media drive 742 (e.g., floppy disk drive, compact disc drive, tape drive, flash drive, and/or solid state drive). Storage devices 740 may be added to the computer system 710 using an appropriate device interface (e.g., a small computer system interface (SCSI), integrated device electronics (IDE), Universal Serial Bus (USB), or FireWire). Storage devices 741, 742 may be external to the computer system 710, and may be used to store image processing data in accordance with the embodiments of the disclosure, such as input image data 101, training data 102, attention mapping data 103, outputs 140 and decision data 145 described with respect to FIG. 1.

The computer system 710 may also include a display controller 765 coupled to the system bus 721 to control a display or monitor 766, such as a cathode ray tube (CRT) or liquid crystal display (LCD), for displaying information to a computer user. The computer system includes a user input interface 760 and one or more input devices, such as a user terminal 761, which may include a keyboard, touchscreen, tablet and/or a pointing device, for interacting with a computer user and providing information to the processors 720. The display 766 may provide a touch screen interface which allows input to supplement or replace the communication of direction information and command selections by the user terminal device 761.

The computer system 710 may perform a portion or all of the processing steps of embodiments of the invention in response to the processors 720 executing one or more sequences of one or more instructions contained in a memory, such as the system memory 730. Such instructions may be read into the system memory 730 from another computer readable medium, such as the magnetic hard disk 741 or the removable media drive 742. The magnetic hard disk 741 may contain one or more data stores and data files used by embodiments of the present invention. The data store may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, input image 101 data, training data 102, attention mapping data 103, outputs 140 and decision data 145 as shown in FIG. 1. Data store contents and data files may be encrypted to improve security. The processors 720 may also be employed in a multi-processing arrangement to execute the one or more sequences of instructions contained in system memory 730. In alternative embodiments, hard-wired circuitry may be used in place of or in combination with software instructions. Thus, embodiments are not limited to any specific combination of hardware circuitry and software.

As stated above, the computer system 710 may include at least one computer readable medium or memory for holding instructions programmed according to embodiments of the invention and for containing data structures, tables, records, or other data described herein. The term "computer readable medium" as used herein refers to any medium that participates in providing instructions to the processors 720 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 741 or removable media drive 742. Non-limiting examples of volatile media include dynamic memory, such as system memory 730. Non-limiting examples of transmission media include coaxial cables, copper wire, and fiber optics, including the wires that make up the system bus 721. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 700 may further include the computer system 710 operating in a networked environment using logical connections to one or more remote computers, such as remote computing device 780, and one or more cameras 781 that capture input images. The network interface 770 may enable communication, for example, with other remote devices 780 or systems and/or the storage devices 741, 742 via the network 77. Remote computing device 780 may be a personal computer (laptop or desktop), a mobile device, a server, a router, a network PC, a peer device or other common network node, and typically includes many or all of the elements described above relative to computer system 710. When used in a networking environment, computer system 710 may include modem 772 for establishing communications over a network 771, such as the Internet. Modem 772 may be connected to system bus 721 via user network interface 770, or via another appropriate mechanism.

Network 771 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 710 and other computers (e.g., remote computing device 780). The network 771 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 771.

It should be appreciated that the program modules, applications, computer-executable instructions, code, or the like depicted in FIG. 7 as being stored in the system memory 730 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 710, the remote device 780, and/or hosted on other computing device(s) accessible via one or more of the network(s) 771, may be provided to support functionality provided by the program modules, applications, or computer-executable code depicted in FIG. 7 and/or additional or alternate functionality. Further, functionality may be modularized differently such that processing described as being supported collectively by the collection of program modules depicted in FIG. 7 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 7 may be implemented, at least partially, in hardware and/or firmware across any number of devices.

It should further be appreciated that the computer system 710 may include alternate and/or additional hardware, software, or firmware components beyond those described or depicted without departing from the scope of the disclosure. More particularly, it should be appreciated that software, firmware, or hardware components depicted as forming part of the computer system 710 are merely illustrative and that some components may not be present or additional components may be provided in various embodiments. While various illustrative program modules have been depicted and described as software modules stored in system memory 730, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for processing an image of an object, comprising:
    receiving an image classification from a trained convolutional neural network (CNN) for an input image of the object, wherein the image classification is a positive classification that corresponds to detection of an anomaly in the input image and the image classification is a negative classification that corresponds to absence of an anomaly in the input image;
    performing a backward propagation analysis of the input image for each layer of the CNN to generate an attention mapping, wherein the attention mapping includes a positive attention map generated from a positive signal in the backward propagation and a negative attention map generated from a negative signal in the backward propagation;
    generating a positive mask based on intensity thresholds of the positive attention map and a negative mask based on intensity thresholds of the negative attention map;
    generating an aggregated mask by aggregating the positive mask and the negative mask; and
    determining an image of segmented anomalous pixels based on a segmentation of the aggregated mask.

2. The method of claim 1, further comprising:
    encoding the positive attention map with the location of the anomalous pixels;
    determining a first threshold and a second threshold for an intensity distribution of the positive attention map; and
    performing a color model estimation of the positive attention map pixels, wherein pixels with an intensity exceeding the first threshold are converted to a first color, pixels with an intensity below the second threshold are converted to a second color, and pixels with an intensity between the first threshold and the second threshold are converted to a third color.

3. The method of claim 2, wherein the first color represents foreground pixels, the second color represents background pixels, and the third color represent pixels not used for segmentation of anomalies.

4. The method of claim 3, further comprising:
    performing a graph cut segmentation on the color model estimation using the input image to generate the image of segmented anomalous pixels.

5. The method of claim 1, wherein performing a backward propagation analysis comprises:
    computing a gradient derivative value for each pixel decision at each convolution layer.

6. The method of claim 1, wherein the input image comprises patches, further comprising:
    performing a classification on each patch of the input image, and
    performing the backward propagation on a patch in response to detecting a positive classification for the patch.

7. The method of claim 6, further comprising:
    dividing the input image into patches in response to detecting a positive classification.

8. A system, comprising:
    at least one memory storing computer-executable instructions; and
    at least one processor configured to access the at least one memory and execute the instructions to:
    receive an image classification from a trained convolutional neural network (CNN) for an input image of an object, wherein the image classification is a positive classification that corresponds to detection of an anomaly in the input image and the image classification is a negative classification that corresponds to absence of an anomaly in the input image;
    perform a backward propagation analysis of the input image for each layer of the CNN to generate an attention mapping, wherein the attention mapping includes a positive attention map generated from a positive signal in the backward propagation and a negative attention map generated from a negative signal in the backward propagation;
    generate a positive mask based on intensity thresholds of the positive attention map and a negative mask based on intensity thresholds of the negative attention map;
    generate an aggregated mask by aggregating the positive mask and the negative mask; and
    determine an image of segmented anomalous pixels based on a segmentation of the aggregated mask.

9. The system of claim 8, wherein the processor is configured to access the at least one memory and execute the instructions to:
    encode the positive attention map with the location of the anomalous pixels;
    determine a first threshold and a second threshold for an intensity distribution of the positive attention mapping; and
    perform a color model estimation of the positive attention map pixels, wherein pixels with an intensity exceeding the first threshold are converted to a first color, pixels with an intensity below the second threshold are converted to a second color, and pixels with an intensity between the first threshold and the second threshold are converted to a third color.

10. The system of claim 9, wherein the first color represents foreground pixels, the second color represents background pixels, and the third color represent pixels not used for segmentation of anomalies.

11. The system of claim 10, wherein the processor is configured to access the at least one memory and execute the instructions to:
    perform a graph cut segmentation on the color model estimation using the input image to generate the image of segmented anomalous pixels.

12. The system of claim 8, wherein the processor is configured to access the at least one memory and execute the instructions to:
    compute a gradient derivative value for each pixel decision at each convolution layer when performing a backward propagation.

13. The system of claim 8, wherein the processor is configured to access the at least one memory and execute the instructions to:
    perform a classification on each patch of the input image, and
    perform the backward propagation on a patch in response to detecting a positive classification for the patch.

14. The system of claim 13, wherein the processor is configured to access the at least one memory and execute the instructions to:
    divide the input image into patches in response to detecting a positive classification.

* * * * *